US012362109B2

(12) United States Patent
Wong et al.

(10) Patent No.: US 12,362,109 B2
(45) Date of Patent: Jul. 15, 2025

(54) ELECTRICAL SWITCH WITH A SEALING MEMBER FOR USE WITH AN ELECTRICAL DEVICE

(71) Applicants: Defond Electech Co., Ltd., Guangdong (CN); Defond Components Limited, Chai Wan (HK)

(72) Inventors: Wai Man Wong, Chai Wan (HK); Ming Leong Kong, Chai Wan (HK); Cheng Chen Nieh, Chai Wan (HK)

(73) Assignees: Defond Electech Co., Ltd., Guangdong (CN); Defond Componets Limited, Chai Wan (HK)

( * ) Notice: Subject to any disclaimer, the term of this patent is extended or adjusted under 35 U.S.C. 154(b) by 0 days.

(21) Appl. No.: 17/185,962

(22) Filed: Feb. 26, 2021

(65) Prior Publication Data

US 2021/0183589 A1 Jun. 17, 2021

Related U.S. Application Data

(63) Continuation of application No. 16/181,220, filed on Nov. 5, 2018, now abandoned.

(30) Foreign Application Priority Data

Nov. 23, 2017 (HK) ................................ 17112336.9

(51) Int. Cl.
*H01H 9/04* (2006.01)
*H01H 9/02* (2006.01)
(Continued)

(52) U.S. Cl.
CPC ............ *H01H 9/04* (2013.01); *H01H 9/0214* (2013.01); *H01H 11/00* (2013.01); *H01H 13/06* (2013.01);
(Continued)

(58) Field of Classification Search
None
See application file for complete search history.

(56) References Cited

U.S. PATENT DOCUMENTS 8,550,181 B2 10/2013 Kobayashi et al.
9,337,571 B2 5/2016 Furuya et al.
(Continued)

FOREIGN PATENT DOCUMENTS

CN 103858054 A 6/2014
CN 203882823 U 10/2014
(Continued)

*Primary Examiner* — Felix O Figueroa
(74) *Attorney, Agent, or Firm* — Feeney IP Law; Daniel W. Sullivan; Alan F. Feeney

(57) ABSTRACT

An electrical switch unit for use in controlling operation of an electrical device, the electrical switch unit including: an electrical switch unit housing for housing at least a pair of electrical switching contacts of the electrical switch unit, said electrical switch unit housing including a first housing member and a second housing member that are configured for attachment together at peripheral regions of the first and second housing members so as to cooperatively form an enclosed space for housing the pair of electrical switching contacts therein; an actuator member operably-connected with at least one of the pair of electrical switching contacts, the actuator being configured for movement relative inwardly and outwardly of an opening in the electrical switch unit housing so as to arrange the pair of electrical switching contacts into at least one of a closed configuration wherein power is able to be supplied from a power source to motor or other electrically-operable element of the electrical device via the pair of electrical switching contacts, and, an opened configuration wherein power is not able to be supplied from the power source to the motor or other electrically-operable element of the electrical device via the pair of electrical switching contacts; and an sealing element
(Continued)

including an elastically-resilient polymeric material, said sealing element being configured for location between the first and second housing members and extending about the peripheral regions of the attached first and second housing members so as to occlude passage and ingress of particulates and water into the electrical switch unit housing.

6 Claims, 5 Drawing Sheets

(51) Int. Cl.

| | |
|---|---|
| ***H01H 11/00*** | (2006.01) |
| ***H01H 13/06*** | (2006.01) |
| *H01H 9/06* | (2006.01) |
| *H01H 13/08* | (2006.01) |

(52) U.S. Cl.
CPC ............ *H01H 9/063* (2013.01); *H01H 13/08* (2013.01); *H01H 2223/002* (2013.01); *H01H 2231/012* (2013.01); *H01H 2231/048* (2013.01)

(56) References Cited

U.S. PATENT DOCUMENTS

| | | | |
|---|---|---|---|
| 9,671,813 | B2 | 6/2017 | Hozumi et al. |
| 2019/0157019 | A1 | 5/2019 | Wong et al. |

FOREIGN PATENT DOCUMENTS

| | | | |
|---|---|---|---|
| CN | 104485242 | A | 4/2015 |
| CN | 105405692 | A | 3/2016 |
| EP | 2323152 | A1 | 5/2011 |
| JP | 2008011604 | A | 1/2008 |

ELECTRICAL SWITCH WITH A SEALING MEMBER FOR USE WITH AN ELECTRICAL DEVICE

CROSS-REFERENCE TO RELATED APPLICATIONS

This application is a continuation of U.S. patent application Ser. No. 16/181,220, filed Nov. 5, 2018 and entitled ELECTRICAL SWITCH WITH A SEALING MEMBER FOR USE WITH AN ELECTRICAL DEVICE, which is incorporated herein by reference in its entirety for all purposes.

TECHNICAL FIELD

The present invention relates to the field of electrical switch units, and in particular relates to electrical switches for use in electrical devices, such as hand-held power tools, personal care devices and home electrical appliances.

BACKGROUND OF THE INVENTION

Hand-held electrical devices such as power tools, personal care devices and home electrical appliances may typically include electric switch units which assist in controlling the supply of power to the motor or other electrically operable elements of the device.

It is of paramount importance that due to environmental factors, such electrical switches prevent ingress of foreign particulates such as dust and water. This is due to longevity of a switch, which typically may be used for numerous cycles when implemented in such devices and appliances. Also, and importantly, from an occupational health and safety risk standpoint, it is important that ingress of foreign matter and water be prevented from entering a switch, as the ingress of such matter can cause short-circuiting as well as electric shock to an operator. Further, such ingress may result in degradation and non-operability of the electrical switch due to exposure of the electrical switch components to foreign particulates such as dust and water.

Depending upon the physical and environmental application, an electrical switch is required to have a requisite level of particulate, dust and water prevention to ingress rating. For example, hand-operable power tools are often exposed to harsh environments such as construction or work sites, whereby there is inherently a high level of dust and particulate matter, as well as often moisture and water. Further, an operator of such devices may have wet hands or gloves with liquid thereon, such as uncured cement or wet paint, which needs to be prevented from entering the electrical switch. Also, a power tool when not used may be laid down in a wet or moist environment or be exposed to the splashing of water. In other applications such as personal care devices, for example hairdryers, inherently there will exist airborne particulate matter as well as water from the hair of an operator or wet surfaces upon which a hairdryer or other device may be laid to rest. Accordingly, from longevity and safety standpoints, ingress into the switch or switch assembly of particulates, dust and water must be suitably resisted or prevented.

Various approaches have been adopted to address the above-described problem. For instance, O-rings may be located adjacent to openings in the electrical switch housing, for instance, at the opening where're the trigger actuator enters the electrical switch housing to provide a barrier against ingress of dust and water. However, as O-rings have a fixed shape and geometry they are suitable for sealing specific regions of an electrical switch housing and are not suitable for sealing regions of the electrical switch housing having non-flat or otherwise irregular shaped surface contours. Alternatively, resins may be used to permanently encapsulate or "potting" electrical and mechanical components of an electrical switch. However, this approach is also inflexible in that once the resin hardens around the electrical and mechanical components of the electrical switch, they cannot then be disassembled, for instance if a faulty component is identified during quality control testing of the electrical switch at the time of manufacture. In certain existing electrical switch units, two sections of an electrical switch housing may be bonded together using an ultrasonic bonding technique in seeking to produce a water proof seal between the housing sections. However, it has been found that ultrasonic bonding tends to be imperfect, resulting in gaps along the join between the two sections of the housing member rendering the electrical switch components exposed to particulates and water that are able to pass therethrough. Furthermore, ultrasonic bonding may result in damage to the components of the electrical switch unit and once bonded together, also does not allow for disassembly of the electrical switch housing if required to replace a faulty component.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides an electrical switch unit for use in controlling operation of an electrical device, the electrical switch unit including: an electrical switch unit housing for housing at least a pair of electrical switching contacts of the electrical switch unit, said electrical switch unit housing including a first housing member and a second housing member that are configured for attachment together at peripheral regions of the first and second housing members so as to cooperatively form an enclosed space for housing the pair of electrical switching contacts therein; an actuator member operably-connected with at least one of the pair of electrical switching contacts, the actuator being configured for movement relative inwardly and outwardly of an opening in the electrical switch unit housing so as to arrange the pair of electrical switching contacts into at least one of a closed configuration wherein power is able to be supplied from a power source to motor or other electrically-operable element of the electrical device via the pair of electrical switching contacts, and, an opened configuration wherein power is not able to be supplied from the power source to the motor or other electrically-operable element of the electrical device via the pair of electrical switching contacts; and an sealing element including an elastically-resilient polymeric material, said sealing element being configured for location between the first and second housing members and extending about the peripheral regions of the attached first and second housing members so as to occlude passage and ingress of particulates and water into the electrical switch unit housing. Typically said sealing element includes an sealing element.

Preferably, the sealing element may be configured to complement a three-dimensional shape contour of the peripheral region of the first or second housing member.

Preferably, the present invention may include at least one of a recess and a groove disposed along the peripheral region of at least one of the first and second housing members configured for seating the sealing element therein.

Preferably, the sealing element may include an overmold.

Preferably, the sealing element may include at least one of a rubber, a foam, and a thermoplastic material.

Preferably, the sealing element may include a cross-sectional shape contour including at least one peak and one trough region. More preferably, the cross-sectional shape contour may include a saw-tooth cross-sectional shape contour.

In a further broad form, the present invention provides a method of producing an electrical switch unit for use in controlling operation of an electrical device, the method including steps of: (i) providing an electrical switch unit housing for housing at least a pair of electrical switching contacts of the electrical switch unit, said electrical switch unit housing including a first housing member and a second housing member that are configured for attachment together at peripheral regions of the first and second housing members so as to cooperatively form an enclosed space for housing the pair of electrical switching contacts therein; (ii) providing an actuator member operably-connected with at least one of the pair of electrical switching contacts, the actuator being configured for movement relative inwardly and outwardly of an opening in the electrical switch unit housing so as to arrange the pair of electrical switching contacts into at least one of a closed configuration wherein power is able to be supplied from a power source to motor or other electrically-operable element of the electrical device via the pair of electrical switching contacts, and, an opened configuration wherein power is not able to be supplied from the power source to the motor or other electrically-operable element of the electrical device via the pair of electrical switching contacts; and (iii) providing a sealing element including an elastically-resilient polymeric material, said sealing element being configured for location between the first and second housing members and extending about the peripheral regions of the attached first and second housing members so as to occlude passage and ingress of particulates and water into the electrical switch unit housing. Typically the sealing element may include an sealing element.

Preferably, the present invention may include a step of forming the sealing element to complement a three-dimensional shape contour of the peripheral region of the first or second housing member.

Preferably, the present invention may include at step of forming at least one of a recess and a groove disposed along the peripheral region of at least one of the first and second housing members configured for seating the sealing element therein.

Preferably, the sealing element may include an overmold.

Preferably, the present invention may include a step of forming the sealing element from at least one of a rubber, a foam, and a thermoplastic material.

Preferably, the present invention may include a step of forming the sealing element wherein a cross-sectional shape contour of the sealing element includes at least one peak and one trough region. More preferably, the cross-sectional shape contour may include a saw-tooth cross-sectional shape contour.

BRIEF DESCRIPTION OF THE DRAWINGS

The present invention will become more fully understood from the following detailed description of a preferred but non-limiting embodiments thereof, described in connection with the accompanying drawings, wherein.

DETAILED DESCRIPTION OF THE PREFERRED EMBODIMENTS

Figure 1B:
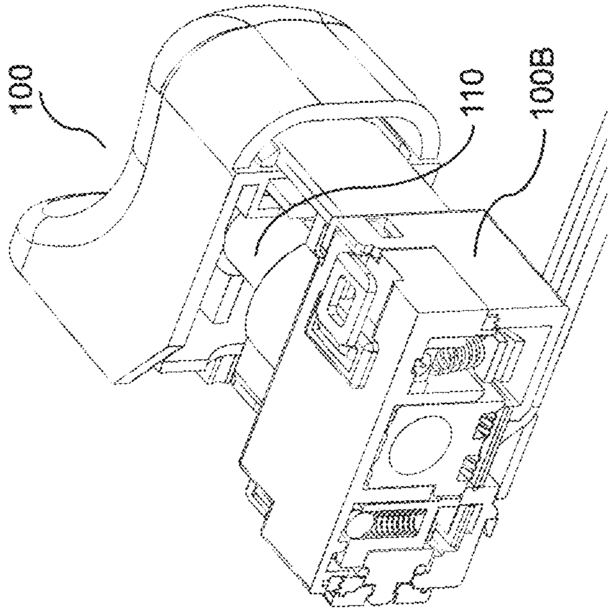
FIG. 1B shows a perspective cross-sectional view of the electrical switch unit of FIG. 1A in accordance with one embodiment of the present invention.
Figure 1A:
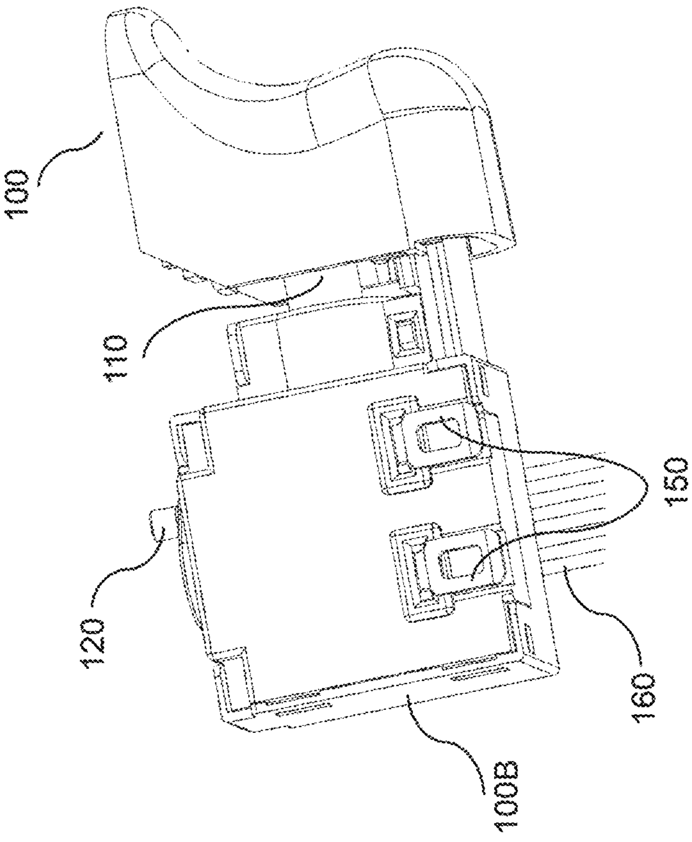
FIG. 1A shows a top perspective view of an electrical switch unit in assembled form in accordance with one embodiment of the present invention.

An embodiment of the present invention will now be described herein with reference to FIGS. 1 to 4B of the drawings. Although embodiments of the present invention will be described in relation to use with an electrical switch unit, it would be appreciated that this is for illustrative purposes only and other embodiments of the inventive concept may be applicable in relation to other types of devices and assemblies. Further, it would be appreciated and understood that whilst this embodiment is described for use with an electric power tool, this is merely for purposes of illustrating functionality and alternate embodiments of the present invention may of course be used with other types of electrical devices such as gardening tools and home electrical appliances. Furthermore, whilst embodiments of the present invention described herein refer to electrical devices comprising an electric motor (for instance, to drive rotation a drill bit), it would be appreciated that alternate embodiments of the present invention may also be applicable to electric devices which comprise a solenoid type electro-mechanical unit to effect operable movement (e.g. reciprocal motion) of the electric device. As shown in FIG. 1A and 1B the electrical switch includes terminals (150) and connector pins (160) extending outwardly from a surface of the assembled unit.

Referring firstly to FIGS. 1A and 1B, the electrical switch unit (100) is shown comprising a first housing member (100A) and a second housing member (100B) which is configured for attachment to the second housing member (which will be referred as a "lower" and "upper" housing members respectively hereafter). The lower and upper housing members (100A,100B) may be heled in attachment together by use of any suitable attachment mechanism such as a screw-type attachment mechanism, a friction fitting attachment mechanism or the like. In this embodiment, the lower and upper housing members (100A,100B) include respective peripheral edge regions (100A',100B') that are configured for attachment together so that the lower and upper housing members (100A,100B) may cooperatively form an enclosed space therebetween for housing various electrical and mechanical components (140) of the electrical switch unit (100) therein. Such electrical and mechanical components (140) may for instance include a pair of electrical switching contacts of the electrical switch unit, a reversing assembly (120) that is actuatable to reverse the direction in which the motor of the electrical device is driven, and at least a portion of a trigger actuator member (110) operably-connected with at least one of the pair of electrical switch contacts. The trigger actuator member (110) is configured for movement relatively inwardly and outwardly of an opening in the electrical switch unit housing (100A,100B) so as to arrange the pair of electrical switch contacts into at least one of a closed configuration wherein power is able to be supplied from a power source of the electrical device to motor via the pair of electrical switch contacts, and, an opened configuration wherein power is not able to be supplied from the power source to the motor of the electrical device via the pair of electrical switch contacts.

In this embodiment, the peripheral edge region (100A') of the lower housing member (100A) includes a recess disposed along the peripheral edge region (100A') that is configured for seating an elongate elastically-resilient polymeric sealing member (130) therein. In alternate embodiments, the peripheral edge region (100A') may instead include a groove or a slot for seating the sealing member (130) therein. Additionally, and/or alternatively, the sealing member (130) may also be maintained in position along the peripheral edge regions (100A',100B') of the lower and upper housing members (100A',100B') by use of an adhesive. The elongate elastically-resilient polymeric sealing member (130) is formed by extruding a material such as rubber, foam, or a thermoplastic material. The approximate cross-sectional dimensions of the sealing member (130) may be selected based on the specific user-requirements. The location of the sealing member (130) between the lower and upper housing members (100A,100B) not only occludes passage and ingress of particulates and water into the electrical switch unit housing but also may provide some degree of dampening of vibrations so as to alleviate damage to the electrical switch unit components (140) therein.

Figure 2A:
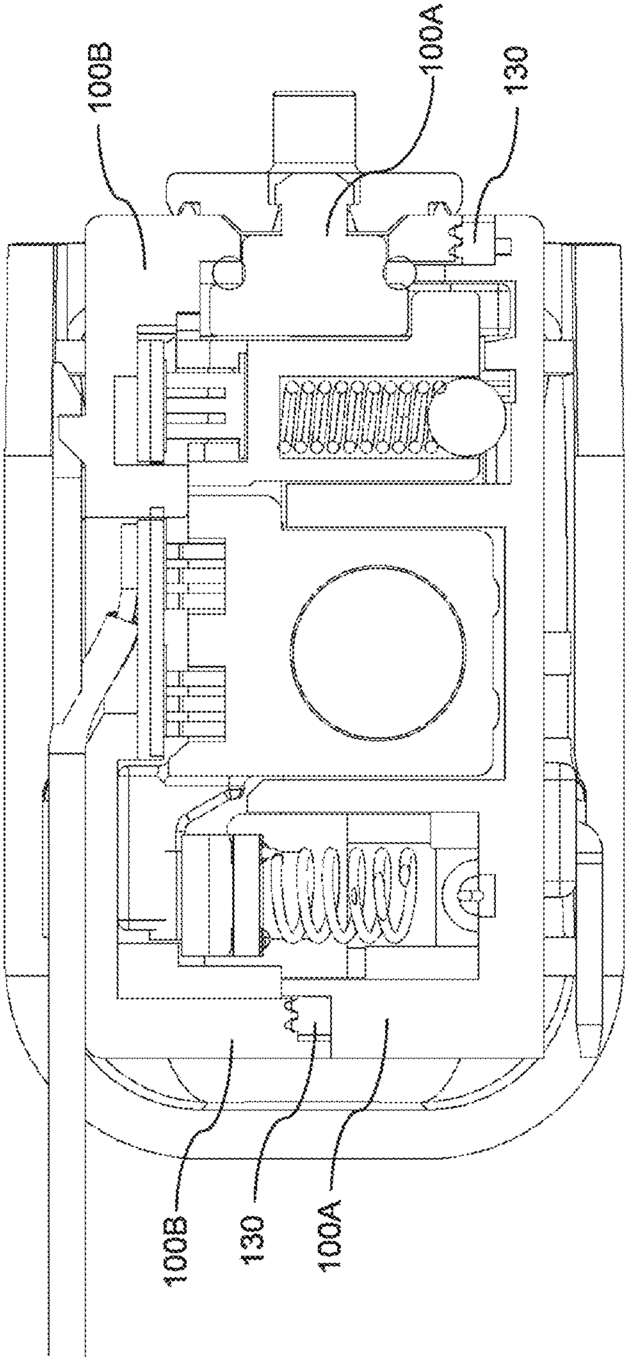
FIG. 2A shows a cross-sectional side-view of the assembled electrical switch unit shown in FIG. 1A in accordance with one embodiment of the present invention.
Figure 2C:
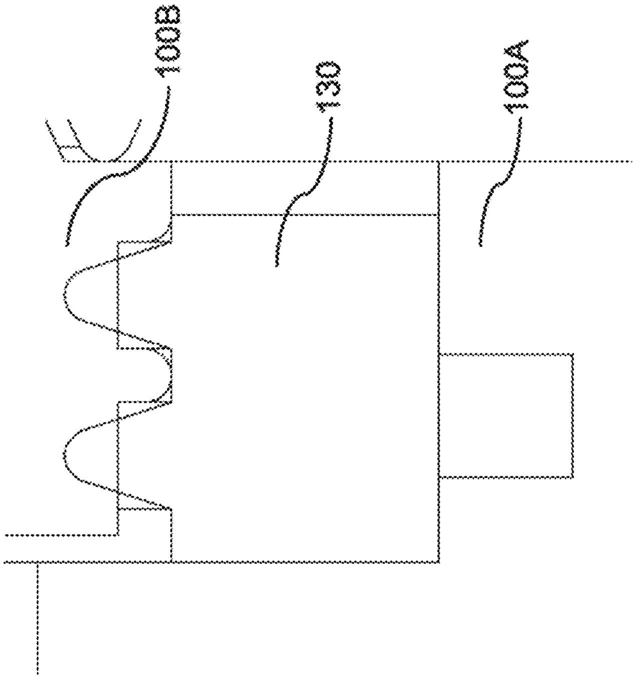
FIG. 2C shows a magnified cross-sectional side-view of another aspect of the assembled electrical switch unit shown in FIG. 2A in accordance with one embodiment of the present invention.
Figure 2B:
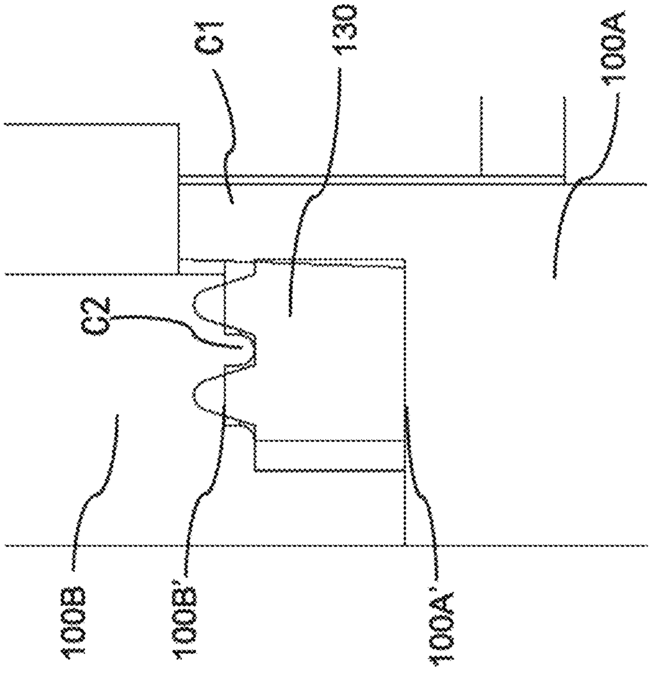
FIG. 2B shows a magnified cross-sectional side-view of one aspect of the assembled electrical switch unit shown in FIG. 2A in accordance with one embodiment of the present invention.

As can be seen in FIGS. 2A and 2B, the elongate sealing member (130) also includes a saw-tooth cross-sectional shape profile. Advantageously, when the lower and upper housing members (100A,100B) are attached together, the sealing member (130) will abut against the peripheral region of the upper housing member. The cross-sectional saw-tooth shape contour of sealing member (130) will tend to contact with the upper housing peripheral region in such a manner to alleviate lateral movement relative to the upper housing member (100B).

Figure 3B:
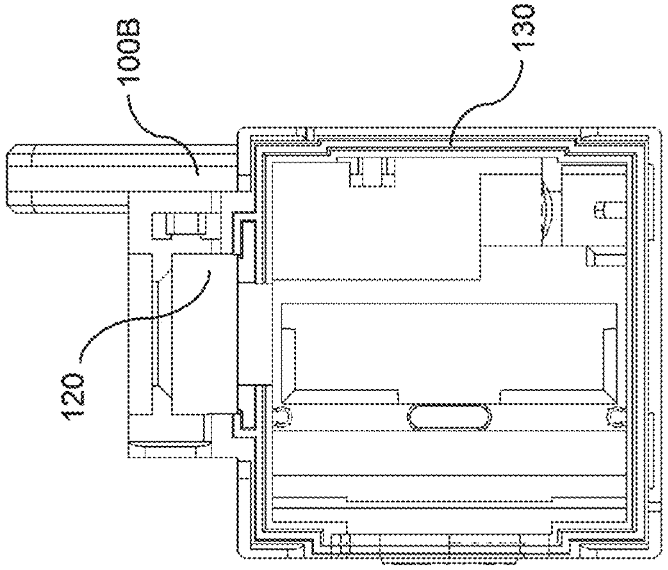
FIG. 3B shows a top view of the electrical switch unit of FIG. 3A with the top housing member removed to reveal an elastically-resilient overmold sealing member seated in a recess disposed along the peripheral region of the lower housing member and extending about the peripheral region of the lower housing member.
Figure 3A:
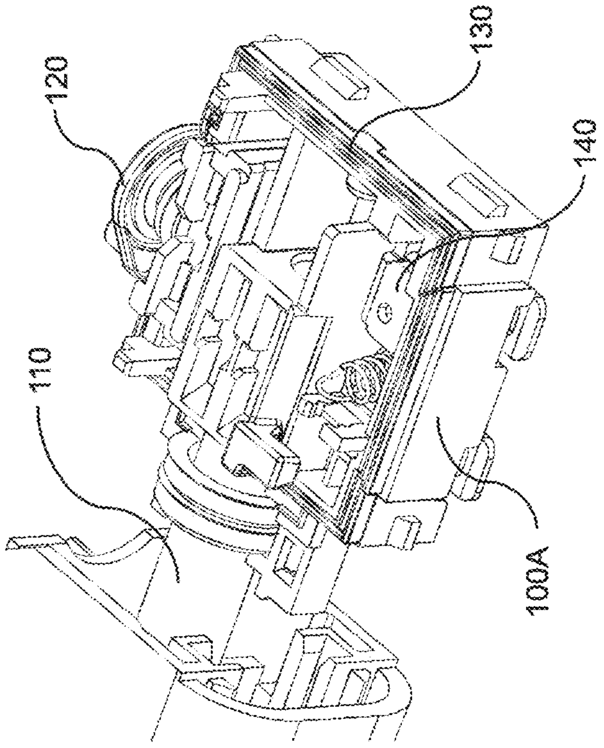
FIG. 3A shows a top perspective view of the electrical switch unit of FIG. 1 with the top housing member removed to reveal an elastically-resilient overmold sealing member seated in a recess disposed along the peripheral region of the lower housing member and extending about the peripheral region of the lower housing member.
Figure 4B:
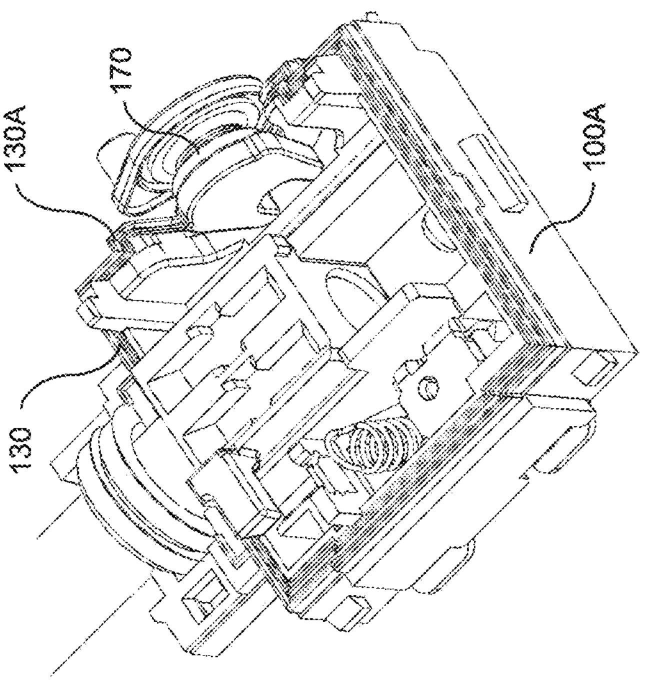
FIG. 4B shows a magnified top perspective cross-sectional view in rendered drawing form of an aspect of the electrical switch unit in FIG. 4A with the top housing member removed to reveal an elastically-resilient overmold sealing member seated in a recess disposed along the peripheral region of the lower housing member and extending about the peripheral region of the lower housing member. Internal components of the electrical switch units within the housing are not shown.
Figure 4A:
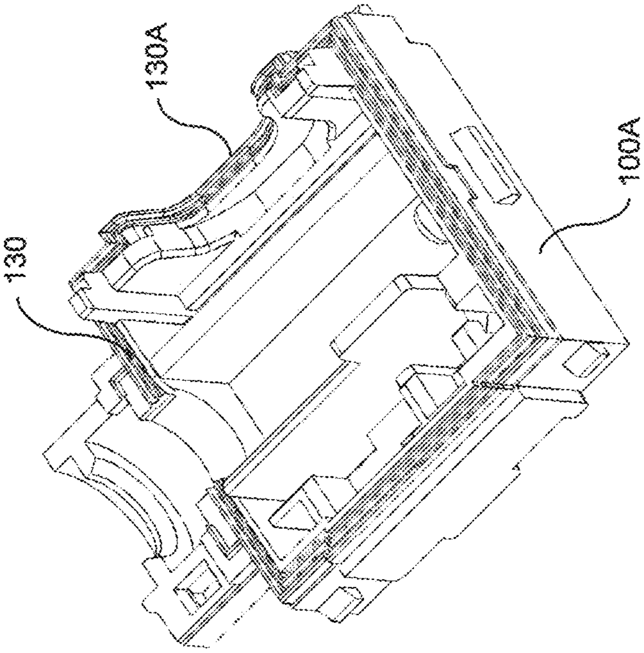
FIG. 4A shows a rendered drawing of a top perspective view of an electrical switch unit with the top housing member removed to reveal an elastically-resilient overmold sealing member seated in a recess disposed along the peripheral region of the lower housing member and extending about the peripheral region of the lower housing member. Internal components of the electrical switch units within the housing are not shown.

Referring to FIGS. 3A, 4A and 4B, it can be seen that the sealing element may be configured to complement a three-dimensional shape contour of the peripheral region of the lower or upper housing members (100A,100B). In this case, the sealing member (130) is configured to not only extend about the peripheral edge region of the lower and upper housing members (100A,100B) in a first two-dimensional plane, but also, includes a portion (130A) that is configured to extend transversely from the two-dimensional plane in a curved contour. As can be seen such an embodiment of the present invention is suitable for accommodating irregular or non-flat surface topologies of the housing members. In this case, the sealing member (130) is suitably shaped to accommodate a curved contour of a reversing module (120) of the electrical switch unit (100). In other embodiments, the flexibility and versatility of the sealing member is able to accommodate even more complex three-dimensional shape contours of the housing member surface topologies. In contrast, existing approaches which for instance utilise O-rings to effect sealing are limited in their degree of flexibility and versatility and are not suited for providing sealing along non-flat or irregular shaped surface topologies.

In certain embodiments, the sealing element (130) may be formed by first forming the lower housing member (100A) and upper housing members (100B) from of a relatively hard plastic material. Thereafter, an overmolding technique may then be used to form a relatively soft elastically-resilient sealing member (130) on the peripheral edge region (100A') of the hard plastic lower housing member (100A). The upper housing member (100B) may thereafter be positioned for attachment with the lower housing member (100A) with the sealing member (130) being sandwiched between the respective peripheral edge regions (100A',100B') of the lower and upper housing members (100A,100B).

As can be seen in the FIG. 4B, O-rings may be used in combination with the sealing member of this embodiments to provide additional sealing protection. For instance, as shown in FIG. 4B, an O-ring (170) may still be utilised to effect sealing about the aperture of the reversing module lever (120). Similarly, in certain embodiments, a glue or resin may be used to provide sealing in regions about the openings in the housing where the terminal (150) and connector pins (160) of the electrical switch unit protrude outwardly. Such additional sealing means may complement the function of the sealing member (130) in preventing ingress of particulates and water into the electrical switch unit housing.

In view of the above it would be appreciated that embodiments of the present invention may provide various advantages over the existing art. Firstly, the novel application of a polymeric sealing member directly between the housing members of the electrical switch housing provides simple, low-cost and effective sealing to prevent ingress of particulates and water which may damage the components of the electrical switch unit. Moreover, this reduces the relatively larger amount of materials, costs and complexity which may otherwise be required to effect sealing at the electrical switch box level rather than the electrical switch housing level. Secondly, embodiments of the present invention utilise a sealing member which is better suited for effecting sealing between housing members of an electrical switch housing having non-flat or irregular shaped surface topologies or contours. In contrast, currently used solutions such as O-rings are of a fixed shape and are limited in their ability to function upon non-flat or irregular shaped surface topologies or contours. Yet further, the novel cross-sectional shape contour of the sealing member may assist in alleviating lateral movement of the sealing member to the upper housing member in use so that sealing may be more effectively maintained.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. An electrical switch unit for use in controlling operation of an electrical device, the electrical switch unit including:

an electrical switch unit housing for housing at least a pair of electrical switching contacts of the electrical switch unit, the electrical switch unit housing including a first housing member and a second housing member that are configured for attachment together at peripheral regions of the first and second housing members so as to cooperatively form an enclosed space for housing the pair of electrical switching contacts therein;

an actuator member operably-connected with at least one of the pair of electrical switching contacts, the actuator being configured for movement relative inwardly and outwardly of an opening in the electrical switch unit housing so as to arrange the pair of electrical switching contacts into at least one of a closed configuration wherein power is able to be supplied from a power source to a motor or other electrically-operable element of the electrical device via the pair of electrical switching contacts, and, an opened configuration wherein power is not able to be supplied from the power source to the motor or other electrically-operable element of the electrical device via the pair of electrical switching contacts;

a sealing element including an elastically-resilient polymeric material, the sealing element being configured for location between the first and second housing members and extending about the peripheral regions of the first and second housing members so as to both occlude passage and ingress of particulates and water into the electrical switch unit housing, and, also being configured to act as a vibration dampener in respect of vibrations experienced by the electrical switch unit housing; and wherein the sealing element comprises a cross-sectional shape contour having only a pair of peaks separated by a trough region and wherein each peak extends an equal height distance relative to the trough region;

wherein the sealing element is arranged on the first housing member;

a first engagement portion protruding from the peripheral region of the first housing member and a second engagement portion protruding from the peripheral region of the second housing member, wherein the top surface of the first engagement portion abuts against the peripheral region of the second housing member when the first housing member and the second housing member are brought in to attachment, the second engagement portion is engages with the trough region of the sealing element when the first housing member and the second housing member are brought in to attachment, wherein a distance from a top surface of the first engagement portion to the peripheral region of the first housing member is greater than a distance from a top of one of the peaks to the peripheral region of the first housing member;

wherein each peak of the pair of peaks of the sealing element is configured only to deform elastically mainly along an axis that is substantially parallel with a direction along which the first and second housing members are brought in to attachment together, due to compression of the pair of peaks between the first and second housing members during attachment; and wherein the sealing element is configured to extend substantially around the peripheral regions of the first and second housing members to effect sealing around a curved contour of a reversing module of the electrical switch unit.

2. An electrical switch unit as claimed in claim 1 including at least one of a recess and a groove disposed along the peripheral region of the first housing member configured for seating the sealing element therein.

3. An electrical switch unit as claimed in claim 1 wherein the sealing element includes an overmold.

4. An electrical switch unit as claimed in claim 1 wherein the sealing element includes at least one of a rubber, a foam, and a thermoplastic material.

5. An electrical switch unit as claimed in claim 1 wherein the cross-sectional shape contour including a saw-tooth cross-sectional shape contour.

6. An electrical switch unit as claimed in claim 1 wherein the sealing element includes an elongate sealing element.

* * * * *